Sept. 4, 1928. 1,682,824
M. BECK
COMBINATION AIR AND ELECTRIC BRAKE
Filed Dec. 26, 1923     3 Sheets-Sheet 2
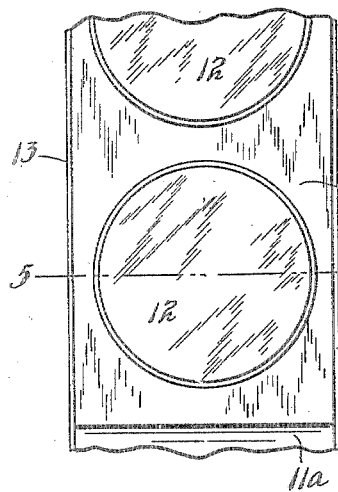
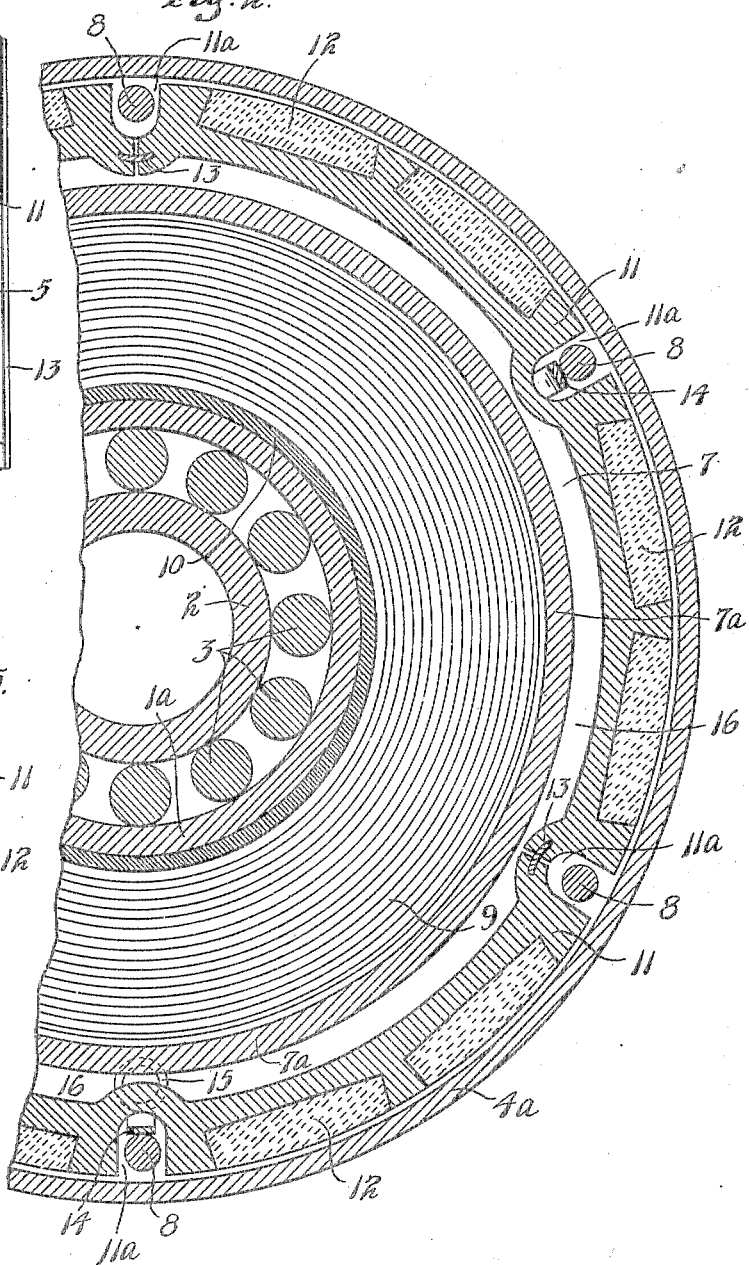
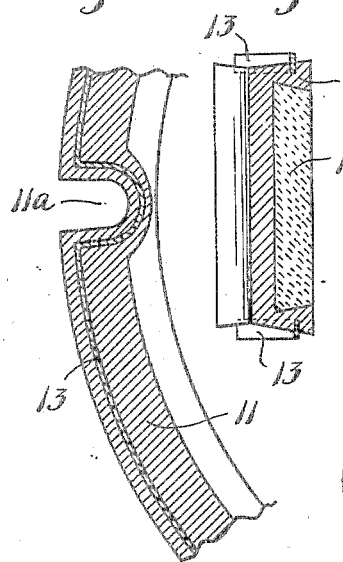
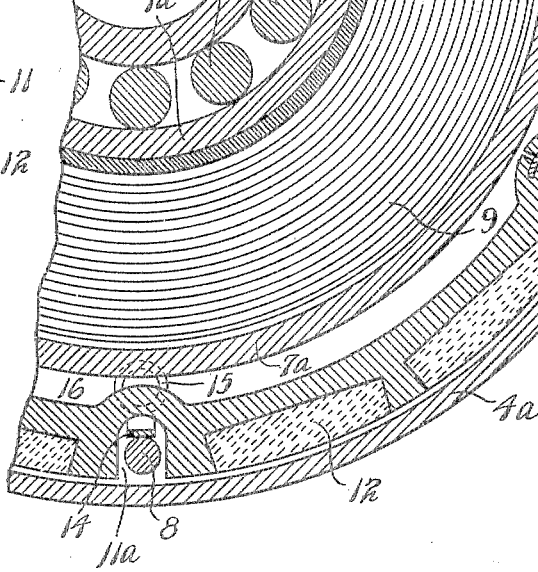
INVENTOR.
MICHAEL BECK
BY HIS ATTORNEY.
James F. Williamson Sept. 4, 1928.  1,682,824
M. BECK
COMBINATION AIR AND ELECTRIC BRAKE
Filed Dec. 26, 1923  3 Sheets-Sheet 3
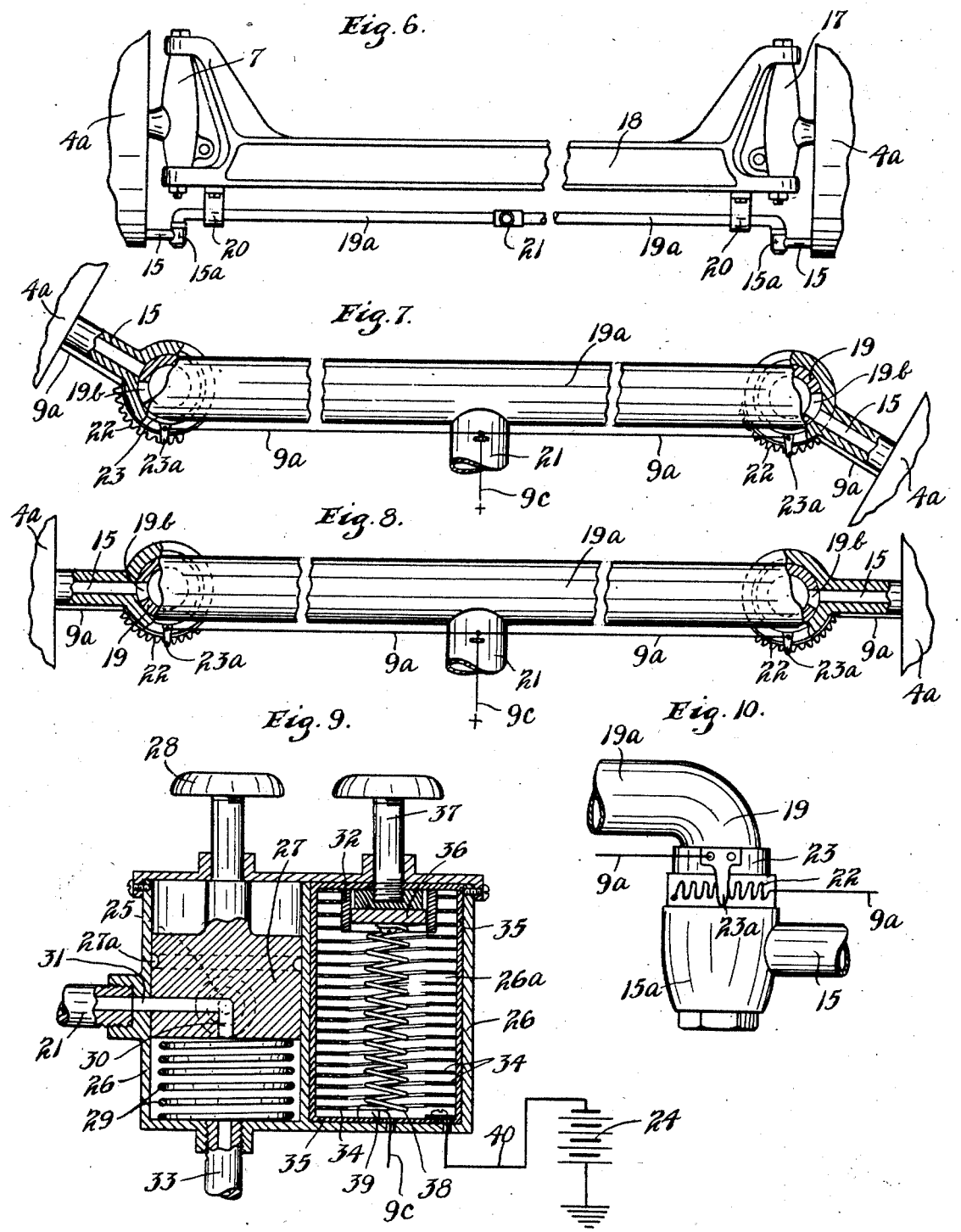
INVENTOR.
MICHEAL BECK.
BY HIS ATTORNEY.
James F. Williamson Patented Sept. 4, 1928.

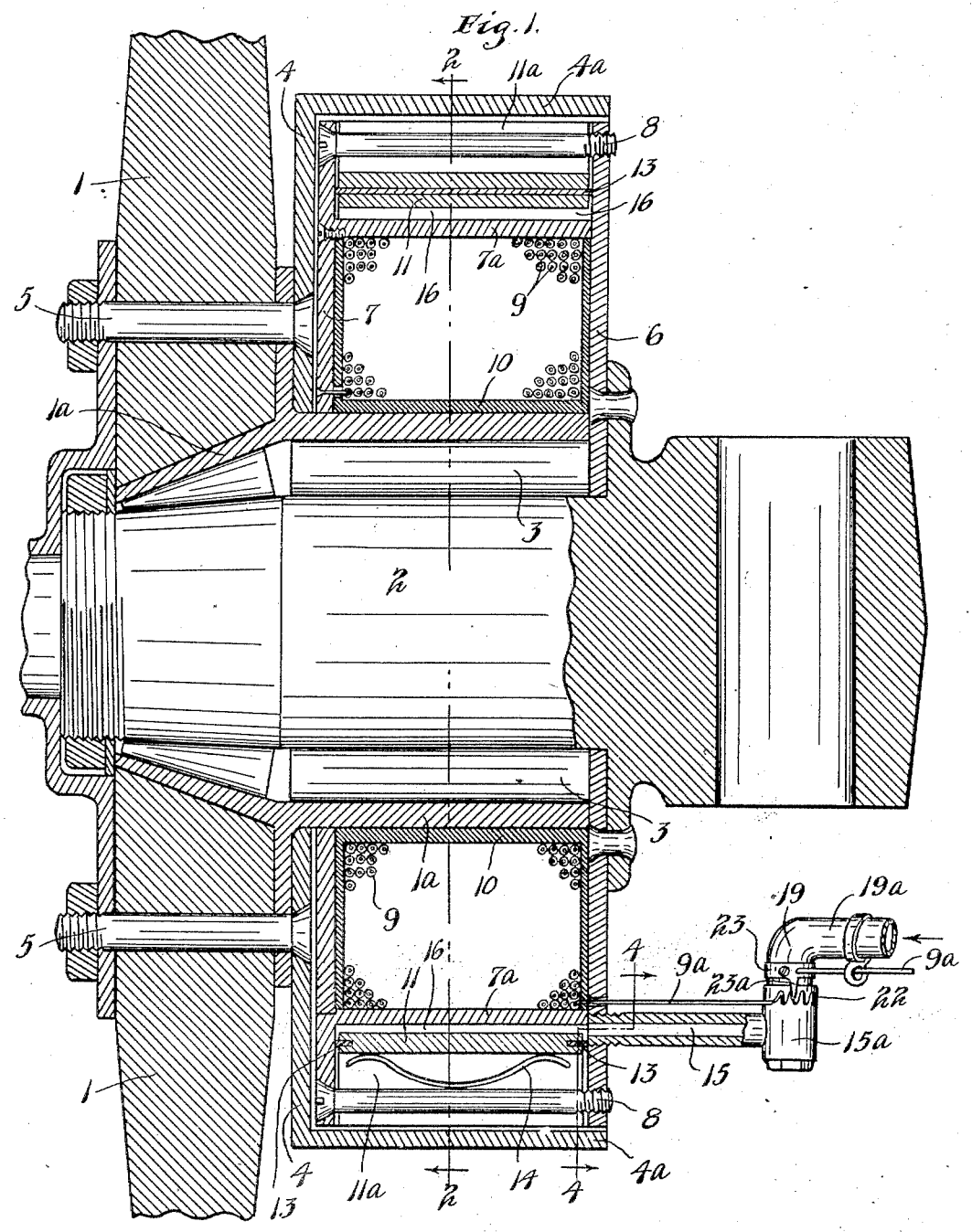

1,682,824

UNITED STATES PATENT OFFICE.

MICHAEL BECK, OF MINNEAPOLIS, MINNESOTA.

COMBINATION AIR AND ELECTRIC BRAKE.

Application filed December 26, 1923. Serial No. 682,676.

This invention relates to a brake mechanism for a vehicle, particularly to such a vehicle as the modern automobile.

It is an object of this invention to provide magnetically operated brake mechanism for the wheels of a vehicle which may be applied either to the front or rear wheels thereof.

It is a further object of the invention to provide a combined magnetically operated and fluid operated brake device adapted to be applied to any of the wheels of a vehicle.

It is a further object of the invention to provide such a magnetically operated and fluid operated brake mechanism for the wheels of the vehicle, together with means for applying a greater braking effect to the wheel moving on the longer radius when the vehicle is turning, said braking effect being proportioned to the amount of turning movement of said wheel relatively to the longitudinal axis of the vehicle.

It is also an object of the invention to provide such a combined magnetically operated and fluid operated braking mechanism together with means by which the brake mechanism can be both magnetically and fluid operated or can be operated either with the magnetic means or the fluid means alone.

These and other objects and advantages of the invention will more fully appear from the following description made in connection with the accompanying drawings in which like reference characters refer to the same parts throughout the different views, and in which, Fig. 1 is a view in vertical section through a portion of an automobile wheel and showing the braking mechanism applied thereto;

Fig. 2 is a vertical section taken on the line 2—2 of Fig. 1, as indicated by the arrows;

Fig. 3 is a partial plan view of the brake shoe used;

Fig. 4 is a partial vertical section taken on the line 4—4 of Fig. 1;

Fig. 5 is a vertical section taken on the line 5—5 of Fig. 3;

Fig. 6 is a view in front elevation of the front axle of an automobile showing a portion of the brake drum and connections thereto;

Fig. 7 is a plan view of the fluid connections to the said front wheels shown on an enlarged scale and a portion thereof being shown on a horizontal section;

Fig. 8 is a view similar to Fig. 7 showing the parts in different positions;

Fig. 9 is a view in vertical section of the controlling means for the brakes; and Fig. 10 is a view in front elevation of the brake adjusting means also shown on an enlarged scale;

Referring to the drawings, in Fig. 1 is shown the central part or hub of an automobile wheel 1 adapted to revolve on an axle 2 which is supplied with the roller bearings 3. Secured to the side of the wheel 1, preferably the inner side, is a brake drum 4 having a laterally extending peripheral and preferably circular flange 4ª, which brake drum will be made of iron or other magnetic material which is secured to the wheel by the headed and nutted bolts 5. A plate or disk 6 is secured to the axle 2, as by the rivets shown, which plate extends parallel to the inner side of drum 4, thus forming an annular chamber between said plate and drum and the hub 1ª of the wheel. The plate 6 is also of iron or other magnetic material. Another plate 7 of non-magnetic material, surrounds the hub 1ª and is spaced slightly from and parallel to the side of the drum 4 and is connected to the plate 6 by a set of circumferentially spaced screws 8 having heads countersunk in the plate 7 and being threaded into plate 6, said screws also being of non-magnetic material. The plate 7 has a flange 7ª spaced from the hub 1ª and extending circumferentially to the plate 6, thus forming an annular chamber between the hub 1ª, plates 6 and 7 and said flange. A magnet coil 9 is disposed in said chamber, the convolutions of which thus extend about hub 1ª and axle 2, said coil extending substantially to the plates 6 and 7 and to the flange 7ª, being separated by insulating material 10 from the plates 6 and 7 and hub 1ª. Disposed radially outward of the flange 7ª is a series of brake shoe sections 11 of the segmental form which are provided with spaced transverse slots 11ª to accommodate the screws 8. Said shoe sections have inserted into their outer peripheries, friction pads 12. While these pads may be of any desired shape, they are, in the embodiment of the invention illustrated, shown as circular and inserted in dove-tailed recesses in said sections, said pads being made of any good friction fiber or other material. The sections 11 are separated centrally of certain of the slots 11ª and said sections are connected by flexible members 13 set therein and extending therebetween, said members 13 projecting at the sides of the sections into contact with the plates 6 and 7 to form an air-tight closure. The members 13 have lateral flanges extending entirely around the shoe sections 11 into contact with the plates 6 and 7, as shown in Fig. 4, so that an airtight chamber is formed between the flange 7ª and the inner side of the shoe 11. Said shoe sections 11 normally are held pressed radially inward by bow plate springs 14 disposed in the slots 11ª and pressing against the bolts 8 and the inner side of said slots. One end 9ᵈ of the magnet coil 9 is connected to the hub 1ª through plate 7, which will be in connection with the other frame parts of the vehicle, while the other end of said coil, as shown at 9ª, extends through the plate 6. A pipe or conduit 15 extends into plate 6 and communicates with a chamber 16 between flange 7ª and shoe sections 11.

It will be understood that the wheel shown in Figs. 1 to 5 is the front wheel of the vehicle and, as is well known, such wheels on the modern automobile, are adapted to turn about the axis of a knuckle 17 pivoted in the axle 18, as shown in Fig. 6. The conduit 15 terminates in a vertical swiveling hub 15ª which receives a conduit 19 having a horizontally extending arm 19ª secured by clips 20 to the axle 18 and which is supplied with air through a conduit 21 from a suitable compressed air supply, not shown, which will be located on the vehicle. As shown in Figs. 7 and 8, the conduit 19 has an opening 19ᵇ therein with which the opening in conduit 15 is adapted to communicate. When the axes of the wheels are in alinement and extend at right angles to the longitudinal axis of the vehicle, the conduits 15 will both register with the ends of the openings 19ᵇ, as shown in Fig. 8. When the wheels are turned about the knuckles 17, as shown in Fig. 7, to make a turn to the right, as seen in Fig. 7, the conduit 15 at the left which will be the wheel moving on the longer radius, is moved out of registry with the opening 19ᵇ, while the wheel at the right has its conduit 15 still in registry with the opening 19ᵇ.

The conductor 9ª forming one end of the magnetic coil 9 is extended along the conduit 15 and connects with a resistance member or coil 22 which is disposed circumferentially about the hub 15ª. A contact ring 23 is secured to the swiveling conduit 19 and insulated therefrom, which ring has a contact point or member 23ª adapted to engage the resistance member or coil 22 and to move thereover as conduit 19 is turned, said point 23ª being connected to another portion of conductor 9ª. When the wheels are in the position shown in Fig. 8, the contact point 23ª will occupy like positions relative to the resistance members 22 so that there will be the same amount of resistance interposed in each member 9ª and the member 9ᶜ will supply equal electric current thereto, said members 9ª being connected by conductor 9ᶜ to a storage battery carried in the vehicle which is diagrammatically shown as 24 in Fig. 9. When, however, the wheels are turned, as shown in Fig. 7, to make a turn to the right, as seen in the drawing, the hub 15ª will swing with the wheel and resistance member 22 at the left will move relatively to the point 23ª at the left so that a greater amount of resistance will be interposed in conductors 9ª and 9 at the left hand side of the vehicle. The hub 15ª at the right will also swivel with conduit 15 and the wheel and resistance 22 will move relatively to point 23ª so that a smaller amount of resistance is interposed in the conductor 9ª at the right hand side of the machine. More current, therefore, will be supplied from conductor 9ᶜ to the magnet on the right hand wheel than will be supplied to the magnet on the left hand wheel.

As stated, a source of compressed air supply will be carried on the vehicle and said supply will be connected to a supply conduit, shown in Fig. 9 as 25, which communicates with a cylindrical chamber in a casing 26. A plunger 27 reciprocates in said casing and is operated by the push button handle 28, said plunger and handle being moved outwardly by the spring 29. The plunger has an annular peripheral groove 27ª therein adjacent its top and is provided with a central passage 30 at its bottom, which passage extends laterally and is adapted to communicate with passage 31 in the hub on the casing 26 and with the conduit 19ª which extends to the wheels by means of a conduit 21. A vent conduit 33 communicates with the casing 26 below the plunger 27 and is adapted to open into the atmosphere at any convenient point. The casing 26 also has another chamber 26ª therein in which is disposed a rheostat having spaced plates 34 suitably housed in an insulated casing 35 in the chamber 26ª. A contact member 36 is reciprocable at the top of chamber 26ª and in an insulating sleeve 32 by means of a push handle 37 to which it is connected by an interposed insulating member, said member 36 when moved downwardly is adapted successively to engage the inner edges of the rheostat plates 34. Contact member 36 is held adjacent the top of the chamber by a compression spring 38 having at its lower end a block 39 to which the conductor 9ᶜ is connected. The lower end of the rheostat 34 is connected to one side of battery 24 by a conductor 40, the other end of the battery being grounded by being connected to the frame of the vehicle. It will be understood that the spring 38 is a conductor connecting the block 39 to the contact member 36.

In operation, if it is desired to apply the brakes to the wheels through the magnetic mechanism, the operator will press upon push button handle 37, contact block 36 will be moved into contact with successive portions of the rheostat 34, depending upon what distance the same is moved, and current will flow from the battery through the rheostat contact member 36, spring 38 and conductor 9ª to the magnets 9 on each wheel, the return circuit being made through the frame of the machine. The farther the handle 37 is moved the greater will be the current supplied to the magnets. The magnets will create a heavy magnetic flux and one pole or armature of the magnet will be formed by the side of drum 4 and its flange 4ª, the magnetic flux traveling in the iron medium. The flux issuing from the other side of the magnetic coil 9 will pass the brake shoe sections 11 and across the space formed between the same and flange 4ª, this being the shortest magnetic path and also being a path through the iron or magnetic material. The brake shoes will thus be attracted to the flange 4ª and will move outwardly into contact therewith and will exert a heavy friction thereagainst, which will brake the drum 4 and thus the wheels 1. If the brakes are applied when the front wheels are turned, as shown in Fig. 1, there will be a greater braking effect exerted on the wheel turning on the shorter radius, or the wheel at the inside of the curve, as previously described, for there will be a greater resistance interposed by resistance member 22 for the wheel at the outside of the curve which will reduce the current supplied to the magnet thereof, and will thus reduce the braking effect. When the handle 37 is released, the contact member 36 will be moved out of engagement with the rheostat by spring 38. The circuit through the magnets will thus be broken and the magnetic force moving the brake shoes 11 discontinued. Springs 14 will then move the brake shoes 11 inwardly to released position.

If it is desired to supply fluid or air pressure to the brakes, the push handle 28 will be pushed in sufficiently to bring the groove 27ª into registry with the conduit 25 and the passage 31. Air pressure will now be supplied from conduit 25 through the groove 27ª and to the conduit 19ª, whence it will pass into the conduits 15 and into the chambers 16 in the brake drums. This air pressure will also force the brake shoe sections 11 radially outward into frictional contact with the brake drum flange 4ª and will produce a braking effect. When the handle 28 is released, plunger 27 will move to the position shown in Fig. 9, said handle and plunger being stopped by the shoulder thereon engaging the opening through which the stem of handle 28 moves. The conduit 9ª and passage 31 will now be brought into communication through passage 30 with the vent conduit 33 so that any pressure in the chambers 16 or conduits 19ª will be relieved and the brake shoe sections released. Springs 14 will then move the brake shoe sections to normal position. As previously stated, if the wheels have their axes alined in a transverse direction, equal pressure will be applied to the brake drums. If, however, the air is applied to the brakes when the wheels are turned, as shown in Fig. 7, a greater braking effect will be applied to the wheel making the shorter turn and if the wheels are sufficiently turned, the braking effect on the wheel making the longer turn may be removed entirely, as shown in Fig. 7. The brakes will simultaneously be moved with both the air and the magnetic force, if desired. The members 13, as stated, contact the plates 6 and 7 and maintain the chamber air tight.

From the above description it is seen that applicant has provided a simple and efficient braking mechanism for vehicles, such as an automobile, which may be easily and quickly applied or released. The device comprises few parts and these are easily and quickly operated. Obviously, the mechanism can be applied to all wheels of a vehicle. The voltage in the magnet need not be high and the magnetic coils will have a large number of turns, thus creating a powerful magnetic brake.

It will, of course, be understood, that various changes may be made in the form, details, arrangement and proportions of the parts without departing from the scope of applicant's invention, which, generally stated, consists in a device capable of carrying out the objects above set forth, such as shown and described and set forth in the appended claims.

What is claimed is:

1. The combination with the wheel and axle of a vehicle, of a brake drum secured to said wheel, having a side wall and a peripheral flange extending laterally therefrom, said drum being of magnetic material carried by said axle spaced from and parallel to said wall, a disk of non-magnetic material within said drum spaced from said last mentioned disk and parallel to and located closely adjacent the wall of said drum, a magnet coil surrounding said axle and disposed between said disks, a series of brake shoes of magnetic material disposed in said drum between said magnet coil and flange, said flange forming one pole of said magnet and said brake shoe forming the other pole thereof, whereby when said magnet is energized, said shoes will be moved against said flange.

2. The combination with the axle of a vehicle and wheels at each end thereof swingable about vertical axes, of a magnetic braking mechanism for each wheel, and means for differentially operating said mechanism when said wheels are swung to one side or the other of the vehicle so that the wheel at the side toward which the wheels are swung will receive the greater braking effect.

3. The combination with the axle of a vehicle and wheels at each end thereof swingable about vertical axes, of a magnetically operated braking mechanism for each wheel, an electric circuit for operating said mechanism, a resistance in the circuit for each mechanism, and means controlled by the turning movement of the wheel to increase the resistance in the circuit controlling the mechanism of the wheel at the side of the vehicle toward which the wheels are turned and to decrease the resistance in the other circuit.

4. The combination with an axle and vehicle wheel turnable about a vertical axis, of a substantially cylindrical brake member secured to said wheel and movable radially thereof, a brake drum secured to said axle, magnetic means adapted to move said member outwardly against said drum to give a braking effect to said wheel, and means to vary said braking effect in proportion to the turning movement of said wheel about its vertical axis.

5. The combination with the wheel and the axle of a vehicle, of a brake drum secured to said wheel having a substantially cylindrical flange, braking means within said flange and adapted to move outward against the same to give a braking effect, a member disposed in said drum and carrying magnetic means for moving said braking means against said flange, and also forming an air chamber inwardly of said braking means, and means for delivering air into said chamber to move said braking means outward against said flange to give a braking effect.

6. The combination with the axle of a vehicle and wheels at each end thereof, swingable about vertical axes, a brake member secured to each of said wheels, braking means adapted to be moved against said brake member to give a braking effect, magnetic means for moving said braking means against said member, pneumatic means for moving said braking means against said member, a member carried by each of said wheels and movable respectively about said vertical axis, a second member adjacent said last mentioned member and means carried by said two last mentioned members for varying the force of the braking effect on the wheel at the side toward which the vehicle is turned.

7. The combination with a vehicle wheel and axle forming relatively movable members, of a brake drum secured to one of said members having a cylindrical flange, a plurality of flexibly connected brake shoes disposed within said drum and said flange and adapted to be moved into engagement therewith, a member disposed in said drum secured to the other of said members and housing said brake shoes, said last mentioned member also having disposed therein, inwardly of said brake shoes, a magnetic coil and means for energizing said coil to cause said brake shoes to be moved outwardly against said cylindrical flange.

In testimony whereof I affix my signature.

MICHAEL BECK.